United States Patent [19]

Pichot et al.

[11] Patent Number: 4,542,849
[45] Date of Patent: Sep. 24, 1985

[54] METHOD AND APPARATUS FOR REGULATING A HEATING INSTALLATION IN PREMISES INCLUDING A PLURALITY OF HEAT GENERATORS

[75] Inventors: Jacky Pichot, Montereau; Jacques Oddou, Fontainebleau, both of France

[73] Assignee: Electricite de France, Paris, France

[21] Appl. No.: 687,732

[22] Filed: Dec. 31, 1984

[30] Foreign Application Priority Data

Jan. 9, 1984 [FR] France ................................ 84 00214

[51] Int. Cl.[4] .......................... G05D 23/12; H02J 3/14
[52] U.S. Cl. ................................ 236/1 EB; 236/46 R; 236/91 F; 237/8 C; 307/39
[58] Field of Search ................ 236/46 R, 1 ER, 91 F; 237/2 B, 8 C; 62/175; 307/39

[56] References Cited

U.S. PATENT DOCUMENTS 4,298,943  11/1981  Tompson et al. ............. 236/91 F X
4,476,920  10/1984  Drucker et al. ................. 237/2 B X Primary Examiner—William E. Wayner
Attorney, Agent, or Firm—Gifford, Van Ophem, Sheridan, Sprinkle & Nabozny

[57] ABSTRACT

The present invention relates to a method and to apparatus for regulating a heating installation in a premises comprising a plurality of heating generators. The apparatus comprises temperature probes (10, 20, 140) which are sensitive to the outside temperature, to the inside temperature, and to the departure temperature of the heating fluid leaving the heating generators. The apparatus further includes means (50, 60, 70, 80 and 100) for determining a reference temperature on the basis of a set temperature (Tc) as indicated by a setting unit (30). A proportional-integral regulator (120), sensitive to the difference between the reference temperature and the departure temperature of the fluid, generates a signal which is applied to threshold detectors which detect the passage of said signal through successive predetermined thresholds, thereby generating successive signals for bringing into service the corresponding heating generator.

11 Claims, 2 Drawing Figures

FIG_1

METHOD AND APPARATUS FOR REGULATING A HEATING INSTALLATION IN PREMISES INCLUDING A PLURALITY OF HEAT GENERATORS

The present invention relates to heating premises.

The present invention relates more particularly to a method and to apparatus for improved regulation of a heating installation in premises which include a plurality of heat generators.

BACKGROUND OF THE INVENTION

Numerous methods of regulation have already been proposed, however, generally speaking, the methods proposed up to now are very poorly adapted to regulating an installation which includes a plurality of heat generators.

Preferred embodiments of the present invention improve the situation on this point.

Further, the method and apparatus for regulating a heating installation in accordance with the invention are adapted to make considerable savings over prior equipment.

Preferred implementations of the present invention regulate a heating installation using two or more kinds of energy, and which automatically takes account of operating priorities for the various heat generators, taking particular account of different tariff periods.

Preferred embodiments of the present invention also provide regulation in which the set temperature of the heating fluid which passes through the heat generators is constantly and automatically servo controlled as a function of the real needs of the premises.

The method of regulation in accordance with the invention is capable, in particular, of integrating free energy supplies and phenomena of thermal inertia associated with the premises under consideration.

SUMMARY OF THE INVENTION

To do this, the method of regulating a heating installation in premises comprising a plurity of heat generators according to the present invention comprises the following steps:

(i) permanently generating a first signal representative of a base temperature proportional to the difference existing between a set temperature and the instantaneous outside temperature;

(ii) permanently generating a second signal representative of a correction applied to the base temperature, and proportional to the difference between the set temperature and the instantaneous inside temperature of the premises;

(iii) periodically generating a third signal representative of an auxiliary correction proportional to the integration over a predetermined period of time of the differences existing between the set temperature and the inside temperature;

(iv) correcting the factor of proportionality between the base temperature and the difference existing between the set temperature and the outside temperature on the basis of the third signal at the end of each predetermined period;

(v) permanently generating a fourth signal representative of a reference temperature corresponding to summing the first three signals;

(vi) determining a fifth signal in a proportional-integral type regulator sensitive to the difference existing between the reference temperature and the temperature of the heated fluid as it leaves the heat generators; and (vii) detecting the passage of the fifth signal through successive predetermined thresholds corresponding to respective commands for putting the said generators into service.

Preferably, the correction applied to the base temperature and determined in the form of the second signal at step (ii) is limited to a maximum $\Delta TDmax$.

Advantageously, step (iv) consists in periodically incrementing a temperature value ($Tm$) which is representative of the outside temperature which corresponds to the set temperature being maintained inside the premises with the heating fluid at its maximul allowable departure temperature, said increment being proportional to the said integration over a predetermined period of the difference existing between the set temperature and the inside temperature of the premises.

Preferably, the set temperature is automatically modulated as a function of a time program.

Further, it is advantageous in a heating installation for premises including a plurality of heating generators and a mixing valve for the regulation method in accordance with the invention to make use of a proportional or a proportional and differential regulator which is sensitive to a reference temperature corresponding to a sum of the three first signals, and which generates a first control signal when the said reference temperature is greater than the departure temperature of the fluid to cause the mixer valve to open for a period of time proportional to the difference between said temperatures, and which generates a second control signal when the said reference temperature is less than the departure temperature of the fluid to cause the mixer valve to close for a period of time which is proportional to the difference between the said temperatures.

The present invention also provides regulation apparatus for a heating installation in premises comprising a plurality of heating generators, the apparatus comprising:

temperature probes sensitive respectively to the instantaneous outside temperature, to the instantaneous inside temperature, and to the departure temperature of the fluid heated by the heating generators;

a unit defining a set temperature;

servo control means suitable for generating a first signal representative of a base temperature proportional to the instantaneous difference between a set temperature and the outside temperature;

main correction means suitable for generating a second signal representative of a correction to be applied to the base temperature and proportional to the instantaneous difference between the set temperature and the inside temperature;

auxiliary correction means suitable for periodically generating a third signal representative of an auxiliary correction proportional to the integration over a predetermined period of the difference between the set temperature and the inside temperature;

self-adaptation means sensitive to the third signal and suitable, at the end of each predetermined period, for correcting the factor of proportionality between the base temperature and the difference between the set temperature and the outside temperature;

reference means suitable for generating a fourth signal representative of a reference temperature corresponding to summing the first three signals;

a proportional-integral regulator sensitive to the difference between the reference temperature and the departure temperature of the fluid heated by the heating generators and generating a fifth signal; and threshold detectors suitable for detecting the passage of the fifth signal through successive predetermined thresholds corresponding to controls for bringing respective ones of the same heating generators into service.

Other features of the apparatus are described below.

However, it may be noted that advantageously the apparatus may further include a coding unit suitable for determining different set temperature values as a function of a time program and a user control, said different set temperature values being used to determine respective reference temperatures for application to the proportional-integral regulator and to the proportional regulator, which regulators are respectively adapted to determine the putting into service of the heating generators and for controlling the mixer valve.

BRIEF DESCRIPTION OF THE DRAWINGS

An implementation of the invention is described by way of example with reference to the accompanying drawings in which.

MORE DETAILED DESCRIPTION

Figure 1:
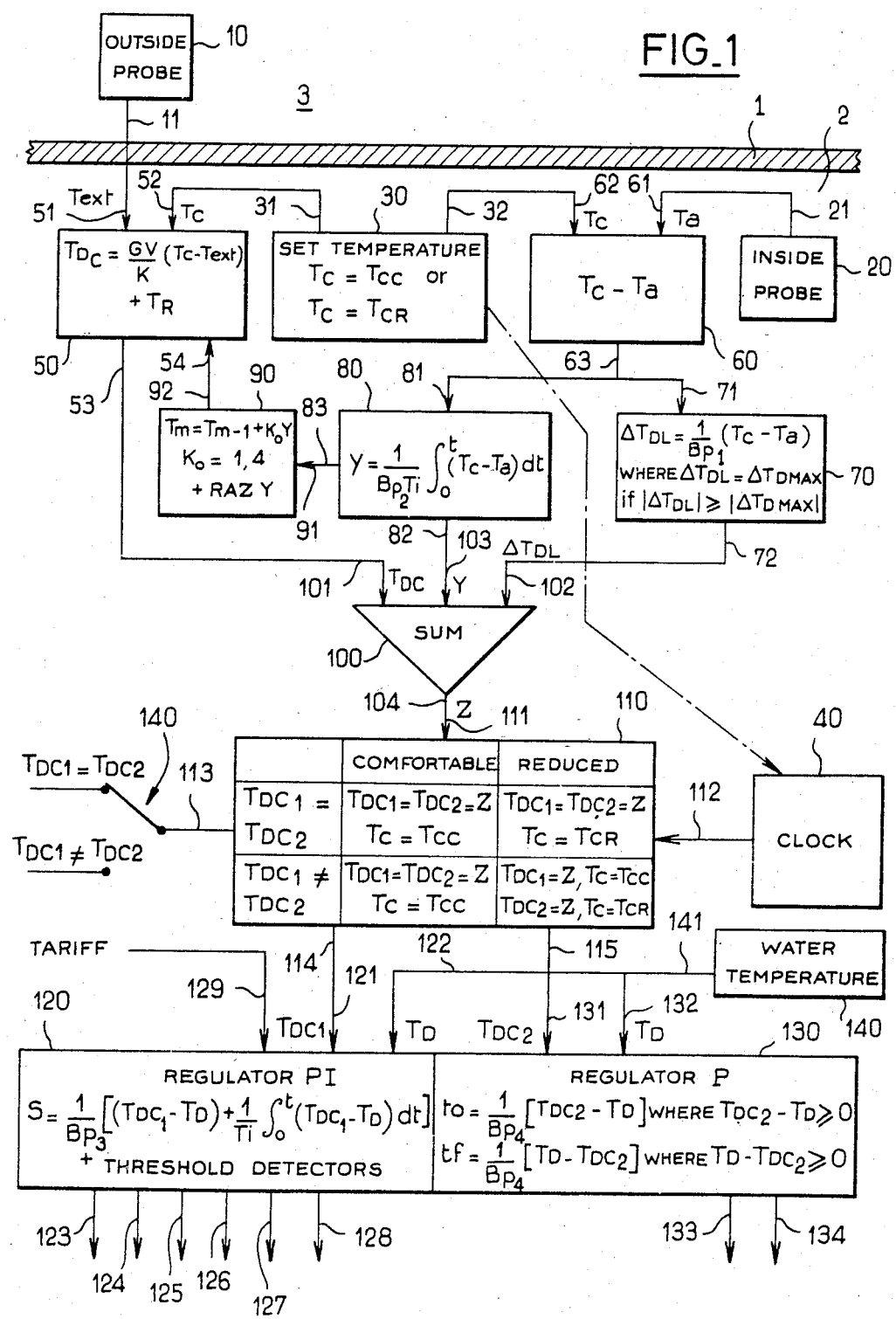
FIG. 1 is a block diagram of apparatus in accordance with the invention.

In FIG. 1, reference 1 designates a wall separating the inside 2 of premises from the outside 3.

A probe 10 placed outside the said premises generates a signal representative of the instantaneous outside temperature Text at an output 11.

Similarly, a probe 20 disposed inside 2 the premises generates a signal representative of the instantaneous inside temperature Ta at an output 21.

Further, a setting unit 30 has outputs 31 and 32 on which it generates signals representative of a set temperature Tc corresponding to the desired inside temperature for the premises.

As is explained below, the set temperature Tc defined by the unit 30 is preferably capable of being modulated in accordance with a predetermined program under the control of a clock 40. For example, the premises may be set to a comfortable temperature Tcc while they are occupied, and to a reduced temperature TcR while they are unoccupied.

The signals generated at the outputs 11, 21, 31 and 32 of the ambient temperature probes 10 and 20 and of the temperature setting unit 30 are used to generate a signal Z representative of a reference temperature in a manner which is described below.

To do this, the signals present at the outputs 11 and 31 from the outside probe 10 and the setting unit 30 (respectively representative of the outside temperature Text and the set temperature Tc) are applied to inputs 51 and 52 of a servo control unit 50 which has an output 53 at which it applies a first signal representative of a base temperature TDc which is proportional to the instantaneous difference existing between the set temperature Tc and the outside temperature Text, using the equation:

$$TD_c = \frac{GV}{K}(T_c - T_{ext}) + TR \tag{1}$$

in which:
  G = the premises heat loss per unit volume coefficient in W/°C. m$^3$
  V = the volume of the premises in m$^3$
  TR = is the return temperature of the heating fluid and may be taken as a constant equal to 20° C., for example
  GV/K = a constant equal to:

$$\frac{GV}{K} = \frac{k_1 - k_2}{T_c - T_m}$$

where $k_1$ is the maximum temperature of TDc and $K_2$ is the minimum temperature of TDc in the proportional range, Tm is the outside temperature at which maximum base power is required to maintain the set temperature Tc inside the premises, for example with $k_1 = 90$ and $k_2 = 20$:

$$\frac{GV}{K} = \frac{90 - 20}{T_c - T_m} \tag{2}$$

Equation (1) is determined on the basis of the following equations:

$$P = GV(T_c - T_{ext}) \tag{3}$$

where P is the power in watts and $$P = k(TD - TR) \tag{4}$$

where
  k = an emission coefficient in W/°C.
  TD is the departure temperature of the fluid, and
  TR is the return temperature of the fluid.

The output 53 from the servo control unit 50 is connected to an input 101 of reference means 100 comprising a three-input summing unit.

In parallel with the above, the signals generated at the outputs 21 and 32 from the inside probe 20 and from the setting unit 30 and respectively represented of the inside temperature Ta and the set temperature Tc are applied to inputs 61 and 62 of a subtractor 60 which generates a signal at its output 63 representative of the difference (Tc − Ta) between the set temperature and the inside temperature.

The output 63 from the subtractor 60 is connected firstly to an input 71 of main correction means 70 and secondly to an input 81 of auxiliary correction means 80.

The main correction means 70 generate a second signal at their output 72 representative of a correction ΔTDL which is proportional to the instantaneous difference existing between the set temperature Tc and the inside temperature Ta on the basis of the equation:

$$\Delta TDL = \frac{1}{B_{p1}}(T_c - T_a) \tag{5}$$

in which $B_{p1}$ represents the proportional range with $$\Delta TDL = \Delta TD_{MAX}$$

if $$|\Delta TDL| \geqq |\Delta TD_{MAX}|.$$

The amplitude limited main correction signal ΔTDL generated at the output 72 is applied to the input 102 of the summing circuit 100 of the above-mentioned reference means.

The auxiliary correction means 80 periodically generates a third signal Y at its output 82. In this context periodically means at each period Ti, which period may be equal to 24 hours for example. The third signal Y is representative of an auxiliary correction which is proportional to the integral over a predetermined period Ti of the difference existing between the set temperature Tc and the inside temperature Ta on the basis of the equation:

$$Y = \frac{1}{B_{p_2} Ti} \int_o^t (Tc - Ta)dt \qquad (6)$$

in which $B_{p2}$ represents the proportional range, and Ti represents the period of integration.

The third signal Y generated at the output 82 is applied to the input 103 of the summing circuit 100 incorporated in the above-mentioned reference means.

Further, self-adapting means 90 having an input 91 connected to an output 83 from the auxiliary correction means 80 to receive the third signal Y, serve, at the end of each predetermined integration period Ti to correct the proportionality factor between the base temperature TDc and the difference existing between the set temperature Tc and the outside temperature Text.

More precisely, as is shown diagrammatically in FIG. 1, the self-adaptation means 90 are suitable for periodically incrementing the value of the outside temperature Tm for which the maximum water departure temperature is imposed (90° C. for example) in order to maintain the set temperature inside the premises, the said incrementation being proportional to the amplitude of the signal Y, i.e. to the integration, over a predetermined period Ti of the difference existing between the set temperature Tc and the inside temperature Ta of the premises.

To do this, the self-adaptation means 90 have an output 92 connected to an input 54 for regulating the servo control unit 50 including means responsive to the equation:

$$Tm = T_{m-1} + K_o Y \qquad (7)$$

where $K_o = 1.4$.

After taking account of the correction factor at each integration Ti, the value of the signal Y as stored for the preceding integration period is reset to zero.

It may be observed that the regulation of the value Tm has the effect of adjusting the slope for determining the base temperature TDc.

By virtue of the self-adaptation process, the installer does not have to worry about regulating Tm. This regulation takes place automatically and in an optimal manner over the entire range of variation in the outside temperature for the location under consideration by minimizing the value of the average correction power required.

Where necessary, means may be provided for correcting the value of Tm in the event that the auxiliary correction signal Y exceeds a predetermined threshold. To make this possible, a suitable threshold detector needs to be provided in the self-adaptation means 90.

In practice, the self-adaptation process is only of interest in the first days after the heating installation has been put into service with an initial value of Tm which is far removed from the final value to which it settles.

More precisely, the factor GV/K used in the equation (1) is modulated on the basis of equation (2) as a function of the value Tm obtained in accordance with equation (7).

The reference means comprising a summing circuit 100 provide a reference signal Z at an output 104 corresponding to the sum of the first, second and third signals $TD_c$, ΔTDL and Y.

It is recalled that the signal $TD_c$ corresponds to the required base temperature, and the signals ΔTDL and Y correspond to correction signals which serve to modulate the predetermined base temperature in order to take account of free energy and also to of thermal inertia in the premises.

In the embodiment shown in FIG. 1, the signal Z representing the reference temperature is applied to an input 111 of a coding unit 110.

The coding unit is also responsive to the program applied by the clock 40 to an input 112 and to user controls applied to an input 113 in a manner explained below, to determine two different set temperature values Tcc or TcR which are used for determining respective reference temperatures $TD_{c1}$ and $TD_{c2}$ that are generated on outputs 114 and 115.

These respective reference temperatures $TD_{c1}$ and $TD_{c2}$ generated on the outputs 114 and 115 are applied respectively to a proportional-integral regulator 120 and to a proportional or a proportional and differential controller 130 whose functions are explained below.

In the implementation shown in FIG. 1, the user command applied to the input 113 of the coding unit 110 is constituted by a switch 140 capable of taking up two different positions. In one of these positions ($TD_{c1} = TD_{c2}$) the switch 140 as set by the user causes the coding unit 110 to generate two reference temperatures $TD_{c1}$ and $TD_{c2}$ which are equal regardless of the required set temperature Tc.

In the second position of the switch 140 as set by the user ($TD_{c1} \neq$ to $TD_{c2}$) the coding unit 110 determines different reference temperatures $TD_{c1}$ and $TD_{c2}$ when a reduced set temperature TcR is requested.

This process is summarized in the table in box 110 of FIG. 1.

In this table it can be seen that:

1. in the first position of the switch $TD_{c1} = TD_{c2}$, for a comfortable set temperature Tcc, both reference temperatures $TD_{c1}$ and $TD_{c2}$ are equal and correspond to the signal Z as generated at the output from the reference unit 100, such that the reference temperature is obtained by putting Tc=Tcc;

2. when the switch is in its first position $TD_{c1} = TD_{c2}$, and a reduced set temperature TcR is required, the two reference values $TD_{c1}$ and $TD_{c2}$ are equal and again correspond to the signal Z from the output of the reference means 100, but in this case Tc=TcR;

3. when the switch 140 is in its second position ($TD_{c1} \neq$ to $TD_{c2}$) and when the comfortable set temperature is required, the reference temperatures $TD_{c1}$ and $TD_{c2}$ are equal to the signal Z generated at the output from the reference means 100 with Tc=Tcc; and 4. when the switch 140 is in its second position (TDc₁≠ to TDc₂) and a reduced set temperature is required, the first reference temperature TDc₁ is equal to the signal Z generated from the output of the reference means 100 by putting Tc=Tcc (the comfortable set temperature) and the second reference temperature TDc₂ is equal to the signal generated at the output of the reference means 100 by putting Tcc=TcR (reduced set temperature).

The use of a control switch 140 which serves to reduce the set temperature Tc in the determination of one only of the reference temperatures serves to considerably reduce the consumption due to some of the heat generators. This disposition is particularly advantageous for a heating installation using two or more kinds of energy.

The signal representative of the reference temperature TDc₁ present at the output 114 of the coding unit 110 is applied to the input 121 of a proportional-integral regulator PI 120. The regulator also has an input 122 on which it receives a signal TD generated at the output 141 of a probe 140 which is sensitive to the departure temperature of the heated fluid as it leaves the heat generators. The proportional-integral regulator PI 120 is thus sensitive to the difference existing between the reference temperature TDc₁ and the departure temperature TD of the heated fluid and generates a fifth signal S on the basis of the equation:

$$S = \frac{1}{B_{p3}} [(TDc_1 - TD) + \frac{1}{Ti} \int_0^t (TDc_1 - TD)dt] \qquad (8)$$

where $B_{p3}$ represents the proportional range of the regulator.

Threshold detectors (not shown in the figures but integrated in the PI regulator 120) detect the passage of the fifth signal S through successive predetermined thresholds corresponding to respective commands to put different heating generators into service. Consequently, the PI regulator generates successive control signals on outputs 123 to 128 suitable for putting the said heating generators into service each time a corresponding threshold is exceeded by the fifth signal S. This disposition is explained below with reference to FIG. 2.

Preferably, as is also shown in FIG. 1, the PI regulator has an input 129 on which it receives a signal representative of tariff periods for at least one of the kinds of energy used by the heating generators.

These two dispositions are particularly advantageous in heating installations which include electrical generators which are put into service on a priority basis during so-called low-tariff periods.

The proportional or proportional and derivative regulator 130 also shown in FIG. 1 receives the reference temperature TDc₂ on its input 131 as generated by the output 115 of the coding unit 110, and has an input 132 on which it receives the signal TD representative of the departure temperature of the fluid as provided by the probe 140. This regulator is used by heating installations which include a mixing valve.

The regulator 130 is adapted to generate a first control signal when the reference temperature TDc₂ is greater than the departure temperature TD of the fluid to impose an open period on the mixing valve which is proportional to the difference between the reference TDc₂ and the departure temperature TD on the basis of the equation:

$$to = \frac{1}{B_{p4}} (TDc_2 - TD) \qquad (9)$$

where
TDc₂−TD≧0 and
$B_{p4}$ is the proportional range of the regulator.

The proportional or proportional differential regulator 130 is in addition adapted to generate a second control signal tf when the said reference temperature TDc₂ is less than the departure temperature TD of the fluid to impose a closure period tf on the mixing valve proportional to the difference between the departure temperature TD of the heating fluid and the reference temperature TDc₂ on the basis of the equation:

$$Tf = \frac{1}{B_{p4}} (TD - TDc_2) \qquad (10)$$

where TD−TDc₂≧0

The control signals generated by the proportional or proportional and derivative regulator 130 for controlling the opening of the mixing valve and the closure thereof are generated respectively on outputs 133 and 134 of the regulator.

In an advantageous variant, when a reduced set temperature TcR is required, this information is taken into account by the outside probe 10 by maintaining a signal Tc at the input 52 of the servo control unit 50 corresponding to a comfortable set temperature, and by increasing the signal representative of the outside temperature Text applied to the input 51 by an amount equal to the difference between the comfortable set temperature Tcc and the reduced set temperature TcR.

It should be observed in addition that it is possible to pass automatically from one kind of energy to another as a function of the tariff periods indicated on the input 129 of the PI regulator 120, e.g. on the basis of information delivered by the electricity utility, and the possibility of forcing operation on one kind of energy or another may also be envisaged under manual control with a consequent modification of the signals appearing on the outputs 123 to 128 of the PI regulator 120.

Furthermore, the regulation provided by the PI regulator 120 which consists in detecting the passage of the fifth signal S through various thresholds ensures that the different heat generators are controlled in stages in a manner which optimally limits their on/off switching.

Figure 2:
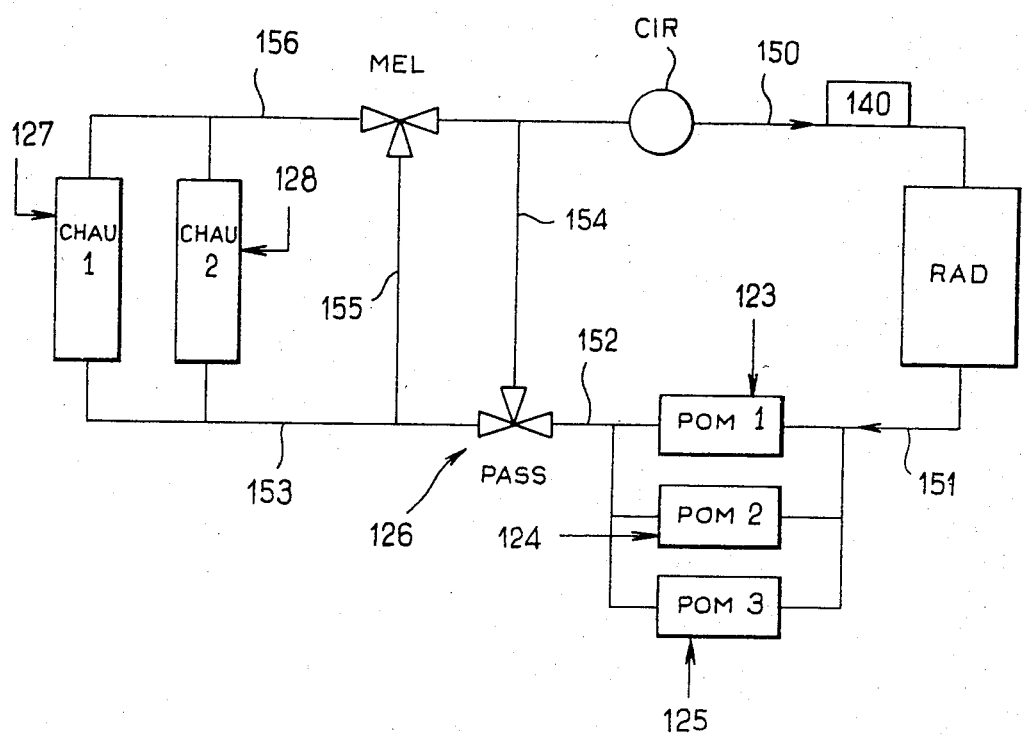
FIG. 2 is diagram of a heating installation suitable for being fitted with regulation apparatus in accordance with the invention.

The structure of the heating installation shown in FIG. 2 is now described.

In FIG. 2 there is a set of radiators RAD which in practice is constituted by a plurality of different radiators connected in parallel but which is shown as a single box in FIG. 2. The set of radiators RAD is supplied by a pipe 150 in which the probe 140 for measuring the departure temperature of the fluid is installed together with a circulator pump CIR. The fluid leaves the set of radiators RAD via a pipe 150 which passes through a set of heat pumps POM 1, POM 2 and POM 3 or through functionally equivalent items connected in parallel. A common output 150 from the heating generators POM 1, POM 2 and POM 3 is connected to a bypass valve referenced PASS in FIG. 2. This valve communicates firstly via a pipe 153 with a plurality of heating generators connected in parallel, e.g. oil-fired boilers CHAU 1 and CHAU 2, and secondly via a pipe 154 with the above-mentioned pipe 150.

Finally, a mixing valve referenced MEL is connected between a pipe 156 which constitutes a common outlet from the second set of heating generators CHAU 1 and CHAU 2 and the point where the above-mentioned pipes 154 and 150 meet. The mixing valve MEL further includes an auxiliary pipe 155 suitable for connecting the departure pipe 150 to the pipe 153 when the mixing valve MEL is in the open position.

The electrically controlled bypass valve PASS is used when the first set of heating generators (POM 1, POM 2 and POM 3) is sufficient for supplying the required heating power to obtain the requested set temperature Tc. In this case the bypass valve directs the fluid as heated by the first set of heating generators directly to the radiators RAD via the pipe 154 without passing through the second set of heating generators, thereby limiting energy losses from the network.

In contrast, when the second set of heating generators is put into service, it is desirable to pre-heat the boilers CHAU 1 and CHAU 2 by diverting warm water through them for a period prior to switching them on, thereby reducing corrosion.

The mixing valve MEL is adapted to control the departure temperature of the water as a function of the valve position.

With reference to FIG. 1, the heating installation thus described is regulated by switching on the heating generators POM 1, POM 2 and POM 3 from the outputs 123, 124 and 125 of the PI regulator 120, while ensuring that the electrically operated bypass valve PASS is set by the output 126 from the regulator 120. The boilers CHAU 1 and CHAU 2 of the second set of heating generators are respectively controlled from the outputs 127 and 128 of the PI regulator 120. The mixing valve MEL is under the control of the other regulator 130, being opened by its output 133 and being closed by its output 134.

For example, it may be supposed that an "on" signal on the output 126 from the PI regulator 120 causes both the bypass valve PASS and the mixing valve MEL to take up positions in which the heating fluid passes completely through the second set of heating generators CHAU 1 and CHAU 2. Further, the mixing valve may be inhibited from operating under the control of the outputs 133 and 134 of the P regulator 130 until at least one of the boilers CHAU 1 and CHAU 2 has been switched on by the PI regulator 120.

It is also possible to envisage that applying an "on" signal to the output 126 of the PI regulator for controlling the bypass valve PASS forces the bypass valve into a position in which the fluid passes completely into the pipes 153 and 155 and authorizes the mixing valve MEL to respond to the outputs 133 and 134 from the P regulator 130.

It may be observed, that the bypass valve PASS is redundant in an installation which includes a mixing valve MEL.

Naturally, the installation and the regulator apparatus which have just been described may be modified in numerous ways while still remaining within the scope of the invention.

We claim:

1. A method of regulating a heating installation in premises including a plurality of heating generators, wherein the method comprises the steps of:
   (i) permanently generating a first signal representative of a base temperature proportional to the difference existing between a set temperature and the instantaneous outside temperature;
   (ii) permanently generating a second signal representative of a correction applied to the base temperature, and proportional to the difference between the set temperature and the instantaneous inside temperature of the premises;
   (iii) periodically generating a third signal representative of an auxiliary correction proportional to the integration over a predetermined period of time of the differences existing between the set temperature and the inside temperature; p1 (iv) correcting the factor of proportionality between the base temperature and the difference existing between the set temperature and the outside temperature on the basis of the third signal at the end of each predetermined period;
   (v) permanently generating a fourth signal representative of a reference temperature corresponding to summing the first three signals;
   (vi) determining a fifth signal in a proportional-integral type regulator sensitive to the difference existing between the reference temperature and the temperature of the heated fluid as it leaves the heat generators; and
   (vii) detecting the passage of the fifth signal through successive predetermined thresholds corresponding to respective commands for putting the said generators into service.

2. A regulation method according to claim 1, wherein the correction applied to the base temperature and determined in the form of the second signal at step (ii) is limited to a maximum $\Delta T_{D}max$.

3. A regulation method according to claim 1, wherein step (iv) consists in periodically incrementing a temperature value (Tm) which is representative of the outside temperature which corresponds to the set temperature being maintained inside the premises with the heating fluid at its maximul allowable departure temperature, said increment being proportional to the said integration over a predetermined period of the difference existing between the set temperature and the inside temperature of the premises.

4. A regulation method according to claim 1, wherein the set temperature is automatically modulated as a function of a time program.

5. A method of regulating a heating installation in premises including a plurality of heating generators and according to claim 1, the heating installation being of the type which includes a mixing valve and the method including the improvement whereby a proportional or a proportional and differential regulator which is sensitive to a reference temperature corresponding to a sum of the three first signals, and which generates a first control signal when the said reference temperature is greater than the departure temperature of the fluid to cause the mixer valve to open for a period of time proportional to the difference between said temperatures, and which generates a second control signal when the said reference temperature is less than the departure temperature of the fluid to cause the mixer valve to close for a period of time which is proportional to the difference between the said temperatures.

6. Apparatus for regulating a heating installation in premises including a plurality of heating generators and temperature probes respectively sensitive to the instantaneous outside temperature, to the instantaneous inside temperature, and to the departure temperature of the fluid as heated by the heating generators, the installation further including a unit for defining a set temperature, wherein the apparatus comprises:

- servo control means suitable for generating a first signal representative of a base temperature proportional to the instantaneous difference between a set temperature and the outside temperature;
- main correction means suitable for generating a second signal representative of a correction to be applied to the base temperature and proportional to the instantaneous difference between the set temperature and the inside temperature;
- auxiliary correction means suitable for periodically generating a third signal representative of an auxiliary correction proportional to the integration over a predetermined period of the difference between the set temperature and the inside temperature;
- self-adaptation means sensitive to the third signal and suitable, at the end of each predetermined period, for correcting the factor of proportionality between the base temperature and the difference between the set temperature and the outside temperature;
- reference means suitable for generating a fourth signal representative of a reference temperature corresponding to summing the first three signals;
- a proportional-integral regulator sensitive to the difference between the reference temperature and the departure temperature of the fluid heated by the heating generators and generating a fifth signal; and
- threshold detectors suitable for detecting the passage of the fifth signal through successive predetermined thresholds corresponding to controls for bringing respective ones of the same heating generators into service.

7. Apparatus according to claim 6, wherein the auxiliary correction means comprise peak clipping means suitable for limiting the amplitude of the second signal to a maximum value.

8. Apparatus according to claim 6, wherein the self-adaptation means comprise incrementation means suitable for periodically incrementing a temperature value (Tm) which is representative of that outside temperature which corresponds to the set temperature (Tc) being maintained inside the premises with the heating fluid at its maximum allowable departure temperature, said increment being proportional to the said integration over a predetermined period (Ti) of the difference between the set temperature (Tc) and the inside temperature (Ti) of the premises.

9. Apparatus according to claim 6, further including a clock suitable for modulating the set temperature in accordance with a predetermined program.

10. Apparatus according to claim 6 for regulating a heating installation including a mixer valve, the regulation apparatus further including a proportional or a proportional and differential regulator sensitive to a reference temperature corresponding to the fourth signal generated by the reference means and adapted to generate a first control signal when the said reference temperature is greater than the departure temperature of the fluid to cause the mixer valve to open for a period of time proportional to the difference between said temperatures, and to generate a second control signal when the said reference temperature is less than the departure temperature of the fluid to close the mixer valve for a period of time which is proportional to the difference between said temperatures.

11. Apparatus according to claim 10, further including a coding unit suitable for determining different set temperature values as a function of a time program and a user control, said different set temperature values being used to determine respective reference temperatures for application to the proportional-integral regulator and to the proportional regulator.

* * * * *

UNITED STATES PATENT AND TRADEMARK OFFICE
CERTIFICATE OF CORRECTION

PATENT NO. : 4,542,849  
DATED : Sept. 24, 1985  
INVENTOR(S) : Jacky Pichot et al Page 1 of 22

It is certified that error appears in the above-identified patent and that said Letters Patent are hereby corrected as shown below:

Column 1,
      line 6, after the title, insert the following headings:

--BACKGROUND OF THE INVENTION

I. <u>Field of the Invention</u>--;

line 9, after "to" insert --an--; same line, after "of" delete "a";

line 10, delete "installation" and insert --installations--;

line 13, delete the heading

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 1, lines 41 and 42, after "installation" insert --,--;

lines 42 and 43, after "generators" insert --,--;

line 43, after "invention" insert --,--;

line 45, delete "permanently" and insert --constantly--;

line 49, delete "permanently" and insert --constantly--;

lines 55 and 56, delete "integration" and insert --integral--;

line 64, delete "permanently" and insert --constantly--.

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

"BACKGROUND OF THE INVENTION"; and insert the following heading:

--II. Description of the Prior Art--;

Column 1, line 15, after "proposed" delete ", however, generally speaking" and insert --. However--.

line 16, after "are" insert --, generally speaking,--;

line 22, before "invention" insert --present--;

line 27, delete "takes", and insert --take--;

line 40, delete the heading "SUMMARY OF THE INVENTION" and insert the following heading:

--Summary of the Present Invention--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 2, line 12, after "temperature" insert --,--;

line 14, delete "maximul" and insert --maximal--;

line 21, after "advantageous" insert --,--;

line 24, after "invention" insert --,--;

line 27, after "signals" delete ", and which" and insert --. The regulator--;

line 29, after "fluid" insert --,--;

line 31, after "temperatures" delete "," and insert --;--;

UNITED STATES PATENT AND TRADEMARK OFFICE
CERTIFICATE OF CORRECTION

PATENT NO. : 4,542,849                   Page 5 of 22

Dated : Sept. 24, 1985
INVENTOR(S) : Jacky Pichot et al

It is certified that error appears in the above—identified patent and that said Letters Patent are hereby corrected as shown below:

Column 2, line 32, delete "which";

line 34, after "fluid" insert --,--;

line 37, delete "regulation" and insert --a regulating--;

line 47, delete "suitable for generating" and insert --adapted to generate--;

line 51, delete "suitable for generating" and insert --adapted to generate--;

line 56, delete "suitable for" and insert --adapted to--;

line 57, delete "generating" and insert --generate--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 2, line 62, delete "suitable" and insert --adapted--; same line, delete "for" and insert --to--;

line 63, delete "correcting" and insert --correct--;

line 66, delete "suitable for generating" and insert --adapted to generate--.

Column 3, line 4, delete "generating" and insert --adapted to generate--;

line 5, delete "suitable for detecting" and insert --adapted to detect--;

line 12, delete "suitable for" and insert --adapted to--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

Page 7 of 22

It is certified that error appears in the above-identified patent and that said Letters Patent are hereby corrected as shown below:

Column 3, line 13, delete "determining" and insert --determine--;

line 19, delete "the putting into service of" and insert --when to put--;

line 20, before "and" and insert --into service,--;

line 22, delete the heading "BRIEF DESCRIPTION OF THE DRAWINGS" and insert the following heading:

--Brief Description of the Drawings--;

line 24, delete "implementation" and insert --embodiment--;

line 28, after "the" insert --present--;

UNITED STATES PATENT AND TRADEMARK OFFICE
CERTIFICATE OF CORRECTION

PATENT NO. : 4,542,849

DATED : Sept. 24, 1985

INVENTOR(S) : Jacky Pichot et al

It is certified that error appears in the above-identified patent and that said Letters Patent are hereby corrected as shown below:

Column 3, line 29, delete "suitable for" and insert --adapted to--;

line 30, delete "regulation" and insert --the regulating--;

line 31, after "the" insert --present--;

line 33, delete the heading "MORE DETAILED DESCRIPTION" and insert the following heading:

--Detailed Description of the Preferred Embodiment of the Present Invention--;

line 34, after "reference" insert --character--;

line 64, delete "it applies" and insert --is generated--.

Column 4, line 19, after "range" insert --and--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 4, line 21, delete "premises, for" and insert --premises. For--; same line, after "example" insert --,--;

line 41, after "of" insert --a--;

line 52, after "of" insert --a--;

line 53, after "of" insert --an--;

line 55, delete "generate" and insert --generates--;

line 56, delete "their" and insert --its--.

Column 5, line 5, delete "the" (second occurrence) and insert --an--;

line 6, delete "100";

line 7, after "means" insert --100--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 5, line 25, delete "the" (first occurrence) insert --an--; same line, delete "100";

line 26, after "means" insert --100--;

line 27, after "Further," insert --a--; same line, after "90" insert --,--;

line 29, delete "serve" and insert --serves--;

line 35, delete "are" and insert --is--;

line 41, delete "integration" and insert --integral--;

line 42, after "T;", insert --,--;

line 45, delete "have" and insert --has--.

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above—identified patent and that said Letters Patent are hereby corrected as shown below:

Column 6, line 11, delete "comprising" and insert --100 comprises--;

line 12, delete "100 provide" and insert --which provides--;

line 19, delete "also to of";

line 36, delete "implementation" and insert --embodiment--;

line 45, delete "to";

line 51, delete "in" and insert --In--;

line 57, delete "when" and insert --When--;

line 63, delete "when" and insert --When--;

line 64, delete "to".

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 10, line 18, (line 23 of Claim 1), delete "permanently" and insert --constantly--;

line 39, (line 6 of Claim 3), delete "maximul" and insert --maximal--;

line 40, (line 7 of Claim 3), delete "the";

lines 40 and 41, (lines 7 and 8 of Claim 3), delete "integration" and insert --integral--;

line 46, (line 3 of Claim 4), delete "a"; same line, delete "program";

line 48, (line 2 of Claim 5), delete "and";

line 49, (line 3 of Claim 5), after "1," insert --wherein--; same line, delete "being" and insert --is--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 10, line 51, (line 5 of Claim 5), delete "including" and insert --includes--; same line, delete "whereby" and insert --wherein--;

line 52, (line 6 of Claim 5), delete "which is";

line 54, (line 8 of Claim 5), after "signals" delete ", and which";

line 56, (line 10 of Claim 5), after "fluid" insert --so as--;

line 57, (line 11 of Claim 5), after "time" insert --,--;

line 58, (line 12 of Claim 5), delete "," and insert --;--;

UNITED STATES PATENT AND TRADEMARK OFFICE
CERTIFICATE OF CORRECTION

PATENT NO. : 4,542,849

DATED : Sept. 24, 1985

INVENTOR(S) : Jacky Pichot et al

Page 14 of 22

It is certified that error appears in the above-identified patent and that said Letters Patent are hereby corrected as shown below:

Column 10, line 59, (line 13 of Claim 5), delete "which";

line 61, (line 15 of Claim 5), after "fluid" insert --, so as--;

line 62, (line 16 of Claim 5), after "time" insert --,--;

line 64, (line 1 of Claim 6), delete "Apparatus" and insert --An apparatus--; same line, after "in" insert --a--;

line 66, (line 3 of Claim 6), delete "respectively";

line 67, (line 4 of Claim 6), delete "to";

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 10, line 68, (line 5 of Claim 6), delete "to"; same line, after "of", delete "the".

Column 11, line 1, (line 6 of Claim 6), delete "as";

line 4, (line 9 of Claim 6), delete "suitable";

line 6, (line 11 of Claim 6), delete "a" and insert --the--;

line 8, (line 13 of Claim 6), delete "suitable";

line 13, (line 18 of Claim 6), delete "suitable";

line 15, (line 20 of Claim 6), delete "integration" and insert --integral--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 11, lines 18 and 19, (lines 23 and 24 of Claim 6), delete "and suitable, at the end of each predetermined period,";

line 20, (line 25 of Claim 6), after "correcting" insert --at the end of each predetermined period--;

line 21, (line 26 of Claim 6), after "temperature" insert --,--;

line 24, (line 29 of Claim 6), delete "suitable";

line 26, (line 31 of Claim 6), delete "summing" and insert --the sum of--;

line 31, (line 35 of Claim 6), after "generators" insert --,--; same line delete "and generating" and insert --which generates--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 11, line 33, (line 37 of Claim 6), delete "suitable";

line 36, (line 40 of Claim 6), delete "respective ones of the same" and insert --the corresponding--;

line 38, (line 1 of Claim 7), delete "Apparatus" and insert --An apparatus--;

line 39, (line 2 of Claim 7), delete "comprise" and insert --comprises a--.

Column 12, line 1, (line 3 of Claim 7), delete "suitable";

line 3, (line 1 of Claim 8), delete "Apparatus" and insert --An apparatus--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 12, line 4, (line 2 of Claim 8), delete "comprise" and insert --comprises an--;

lines 4 and 5, (lines 2 and 3 of Claim 8), delete "suitable";

line 6, (line 4 of Claim 8), delete "which is"; same line, delete "that" and insert --an--;

lines 10 and 11, (lines 8 and 9 of Claim 8), delete "said integration" and insert --integral--;

line 14, (line 1 of Claim 9), delete "Apparatus" and insert --An apparatus--;

line 15, (line 2 of Claim 9), delete "suitable";

line 17, (line 1 of Claim 10), delete "Apparatus" and insert --An apparatus--;

UNITED STATES PATENT AND TRADEMARK OFFICE
CERTIFICATE OF CORRECTION

PATENT NO. : 4,542,849

DATED : Sept. 24, 1985

INVENTOR(S) : Jacky Pichot et al

It is certified that error appears in the above-identified patent and that said Letters Patent are hereby corrected as shown below:

Column 7, line 1, delete "when" and insert --When--;

line 2, delete "to";

line 13, delete "due to some";

line 19, delete "a" and insert --the--;

line 55, delete "its" and insert --an--;

line 64, after "fluid" insert --,--;

line 65, delete "an open" and insert --a--; same line, delete "on the" and insert --for opening the--.

Column 8, line 24, delete "respectively"; same line, after "on" insert --the--;

line 25, delete "regulator." and insert --regulator, respectively.--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 8, line 41, delete "forcing operation" and insert --selectively operating--;

line 46, after "120" insert --,--.

line 47, after "thresholds", insert --,--;

Column 9, line 53, delete "authorizes" and insert --directs--;

line 56, after "observed" delete ",";

line 67, (line 4 of Claim 1), delete "permanently" and insert --constantly--.

Column 10, line 3, (line 8 of Claim 1), delete "permanently" and insert --constantly--;

line 10, (line 15 of Claim 1), delete "integration" and insert --integral--;

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 12, lines 18 and 19 (lines 2 and 3 of claim 10), delete "regulation" and insert --regulating--;

line 25, (line 9 of Claim 10), after "fluid" insert --, so as--;

line 27, (line 11 of Claim 10), after "temperatures" delete "," and insert --;--;

line 29, (line 13 of Claim 10), after "fluid" insert --, so as--;

line 32, (line 1 of Claim 11), delete "Apparatus" and insert --An apparatus--;

line 33, (line 2 of Claim 11), delete "suitable";

UNITED STATES PATENT AND TRADEMARK OFFICE
CERTIFICATE OF CORRECTION

PATENT NO. : 4,542,849
DATED : Sept. 24, 1985
INVENTOR(S) : Jacky Pichot et al

It is certified that error appears in the above-identified patent and that said Letters Patent are hereby corrected as shown below:

Column 12, lines 37 and 38, (lines 6 and 7 of Claim 11) delete "regulator and to the" and insert --or--.

Signed and Sealed this

Third Day of February, 1987

Attest:

DONALD J. QUIGG

Attesting Officer

Commissioner of Patents and Trademarks